(12) United States Patent
Min et al.

(10) Patent No.: US 7,643,579 B2
(45) Date of Patent: Jan. 5, 2010

(54) MULTIPLE DIFFERENTIAL DEMODULATOR USING WEIGHTING VALUE

(75) Inventors: Sang Hyun Min, Kyungki-Do (KR); Tah Joon Park, Kyungki-Do (KR); U Sang Lee, Kyungki-Do (KR); Koon Shik Cho, Seoul (KR); Kwang Mook Lee, Seoul (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 572 days.

(21) Appl. No.: 11/457,116

(22) Filed: Jul. 12, 2006

(65) Prior Publication Data

US 2007/0014384 A1   Jan. 18, 2007

(30) Foreign Application Priority Data

Jul. 15, 2005   (KR) ...................... 10-2005-0064203

(51) Int. Cl.
*H04L 27/22* (2006.01)
*H03D 3/22* (2006.01)
*H04L 27/06* (2006.01)

(52) U.S. Cl. ........................ 375/325; 375/331; 375/343; 329/304

(58) Field of Classification Search ................. 375/316, 375/324, 325, 331, 340, 343; 329/304
See application file for complete search history.

(56) References Cited

U.S. PATENT DOCUMENTS

| | | | | |
|---|---|---|---|---|
| 5,684,835 A | * | 11/1997 | Kroeger et al. | 375/325 |
| 6,108,317 A | * | 8/2000 | Jones et al. | 370/320 |
| 6,487,260 B1 | * | 11/2002 | Schweickert et al. | 375/343 |
| 7,173,992 B2 | * | 2/2007 | Frigon | 375/354 |

* cited by examiner

*Primary Examiner*—Young T. Tse
(74) *Attorney, Agent, or Firm*—Lowe Hauptman Ham & Berner (57) ABSTRACT

The present invention relates to a multiple differential demodulator using a weighting value. The multiple differential demodulator according to the present invention includes a weighting value generator for integrating a real part and an imaginary part of a value acquired by multiplying one of a plurality of differentiated reception signals by a conjugated value of a differentiated PN code signal corresponding to a preset symbol, and determining the greater of the integrated real and integrated imaginary parts to apply a predetermined weighting value to the greater value, where the PN code signal is differentiated in the same fashion as the differentiated reception signals.

4 Claims, 8 Drawing Sheets

Prior art

MULTIPLE DIFFERENTIAL DEMODULATOR USING WEIGHTING VALUE

CLAIM OF PRIORITY

This application claims the benefit of Korean Patent Application No. 2005-64203 filed on Jul. 15, 2005, in the Korean Intellectual Property Office, the disclosure of which is incorporated herein by reference.

BACKGROUND OF THE INVENTION

1. Field of the Invention

The present invention relates to a multiple differential demodulator used in a wireless communication system such as a WPAN and sensor network. More particularly, the invention relates to a multiple differential demodulator which does not employ square operations conducted by a correlator of a noncoherent detector in a conventional multiple differential noncoherent demodulator but applies a weighting value to the greater value of either a real part or an imaginary part to decrease phase offsets, thereby eliminating square loss.

2. Description of the Related Art

The term "ubiquitous" has been proposed recently to refer to a communication environment in which one can connect to a network at any time, any place. In addition, there have been active researches on small-scale wireless communication systems such as a Wireless Local Area Network (WLAN), Wireless Personal Area Network (WPAN), sensor network, Radio Frequency Identification (RFID), and the like rather than large-scale communication networks such as a cellular network.

Among these communication systems in particular, WPAN and sensor network require ultra-small size, low power consumption, and low price in addition to communication performance. Therefore, high-performance and expensive components used in the existing cellular communication systems or WLAN systems are hardly employed in the small-scale wireless communication systems including the WPAN and sensor network. However, if low-price components are adopted to lower the costs, frequency or phase offsets can occur, which requires a solution.

Therefore, there have been researches on a demodulator that performs well in a communication system with large frequency or phase offsets.

Figure 1:
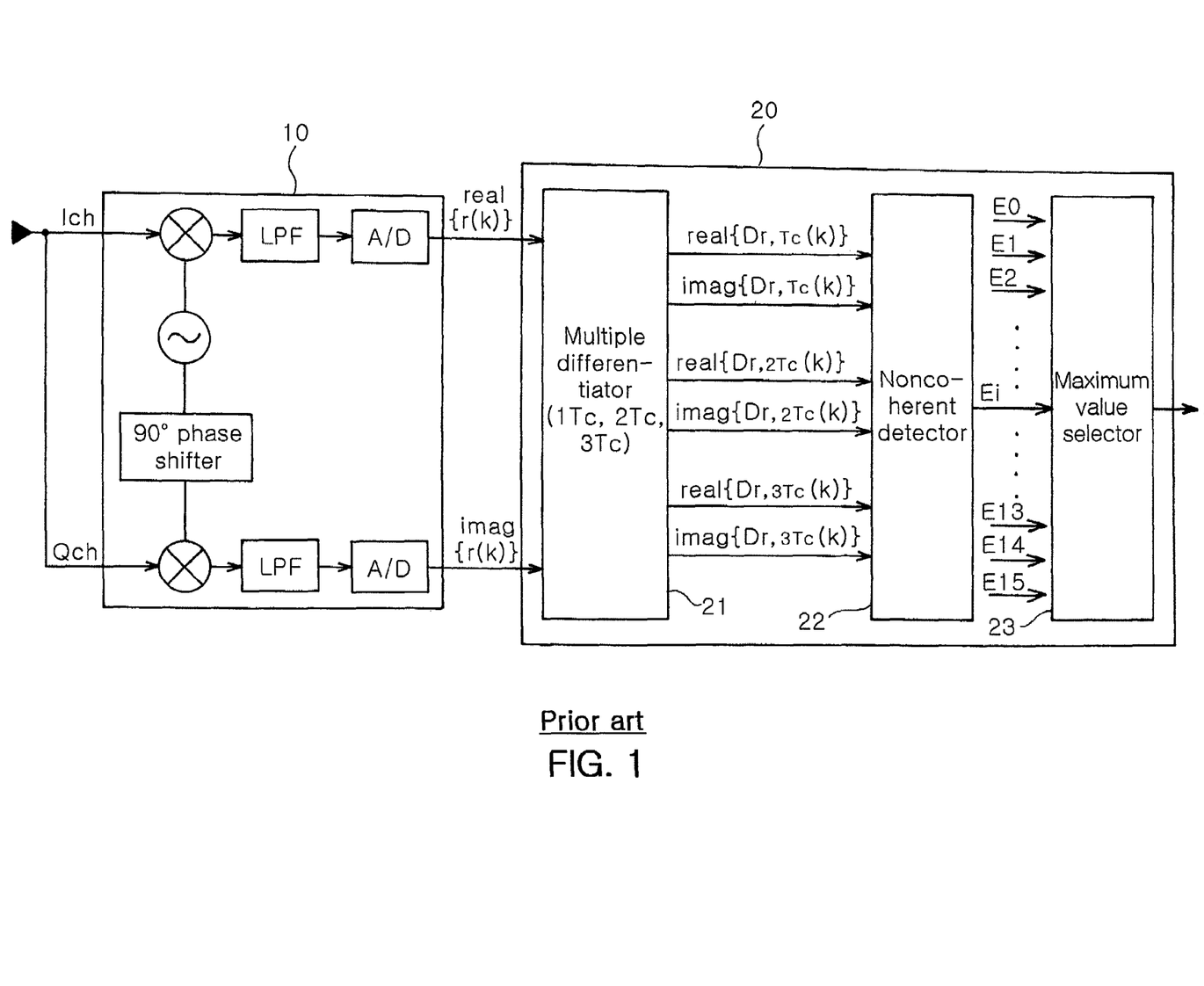
FIG. 1 is a block diagram illustrating a conventional multiple differential noncoherent demodulator.

FIG. 1 is a block diagram illustrating a conventional multiple differential noncoherent demodulator proposed to compensate for frequency or phase offsets.

Referring to FIG. 1, the conventional multiple differential noncoherent demodulator 20 includes a multiple differentiator 21 for multi-delaying an I/Q signal outputted from an IF end 10 of a receiver to differentiate the signal, a plurality of noncoherent detectors 22 (only one is illustrated) for computing the correlations between the differentiated reception signals outputted from the multiple differentiator 21 and PN codes corresponding respectively to 16 symbols, and a maximum value selector 23 for comparing output results of the plurality of noncoherent detectors 22 to detect the maximum correlation value and determining a symbol of the PN code having the maximum correlation value as the symbol of the reception signal.

The conventional multiple differential noncoherent demodulator 20 can be described in greater detail as follows. An RF reception signal is frequency-converted into an IF signal at an RF end (not shown) of a receiver, separated and converted into a baseband I/Q signal by a mixer of the IF end 10. Then, the signal is sampled by an analogue/digital converter A/D and inputted into a demodulator 20 as a digital signal. The reception signal r(k) (k represents a sequence of a received packet) is a complex signal, where a real part is represented by "real{r(k)}" and an imaginary part by "imag{r(k)}."

Figure 2:
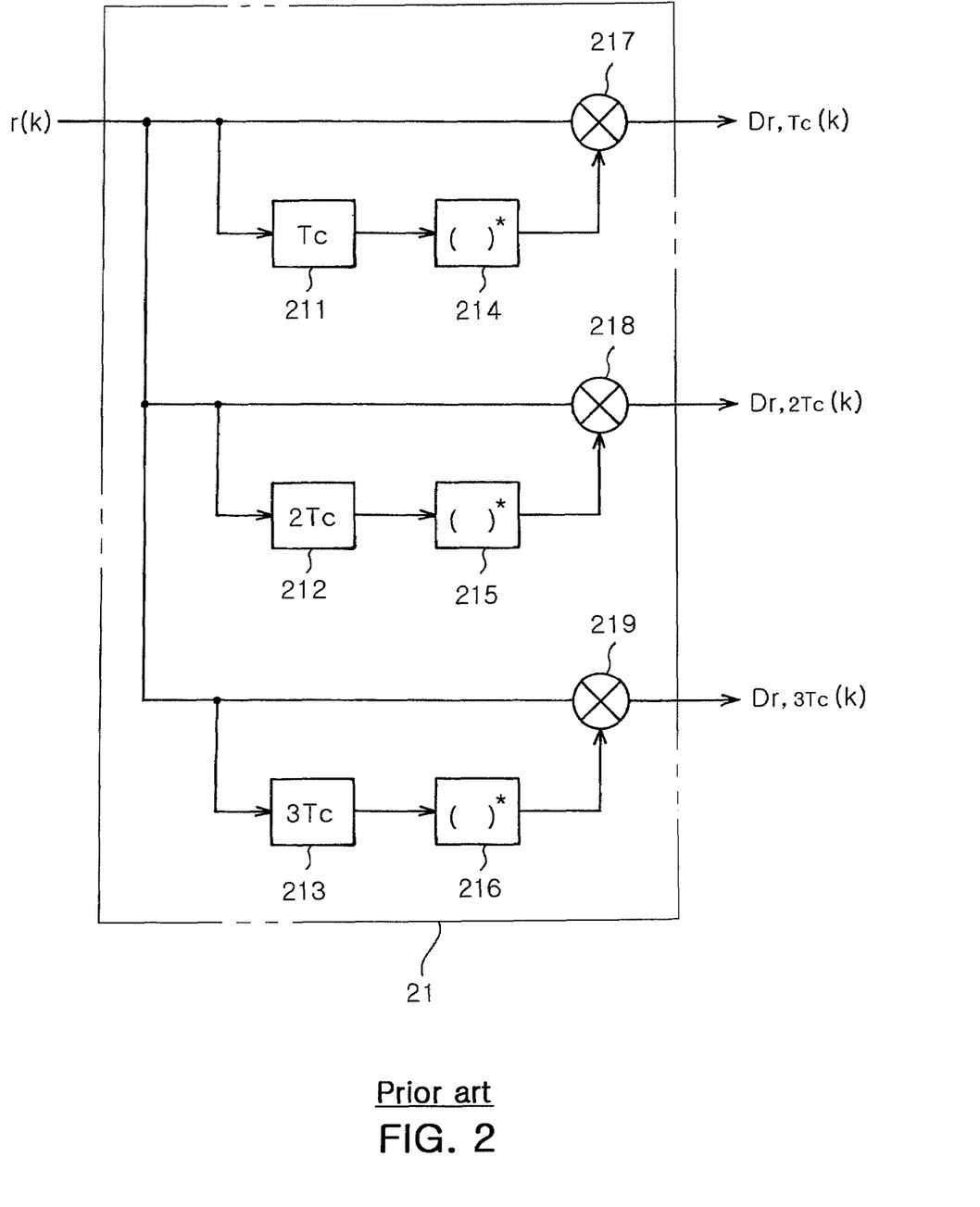
FIG. 2 is a detailed block diagram illustrating a multiple differentiator in the conventional multiple differential noncoherent demodulator.

Thereafter, demodulation is executed on the digitized baseband signal, real{r(k)} and imag{r(k)}. First, the multiple differentiator 21 in the demodulator 20 complex-multiplies the digital signal (the signal received before the predetermined delay times) delayed by predetermined delay times 1Tc, 2Tc and 3Tc by a current reception signal to acquire differentiated values. FIG. 2 shows blocks of the multiple differentiator 21 in detail. The multiple differentiator 21 delays the signal r(k) received at the IF end 10 (FIG. 1) by delayers 211 to 213 having a plurality of predetermined delay times, e.g. Tc, 2Tc and 3Tc, and conjugates the delayed signals by conjugators 214 to 216. Then, each of the multipliers 217 to 219 multiplies the reception signal r(k) by the delayed conjugated signals to output differentiated signals. Thus, a plurality of differentiated signals $D_{r,Tc}(k)$, $D_{r,2Tc}(k)$ and $D_{r,3Tc}(k)$ delayed by different delay times are outputted from the multiple differentiator 21. Given that the signal r(k) received at the multiple differentiator 21 is represented as in Equation 1, the output signal of the multiple differentiator 21 can be represented as in Equation 2.

$$r(k) = s(k)e^{j2\pi\Delta fk} \quad \text{Equation 1}$$

$$\begin{aligned} D_r(k) &= r(k)r(k-N)^* \\ &= s(k)e^{j2\pi\Delta fk} s(k-N)^* e^{-j2\pi\Delta f(k-N)} \\ &= s(k)s(k-N)^* e^{j2\pi\Delta fN} \\ &= s(k)s(k-N)^* (\cos 2\pi\Delta fN + j\sin 2\pi\Delta fN) \end{aligned} \quad \text{Equation 2}$$

In above Equations 1 and 2, s(k) is a transmission signal, i.e., a PN code of a symbol corresponding to the reception signal. Examining Equation 1, the reception signal r(k) includes channel distortion of $e^{j2\pi\Delta fk}$ in addition to the transmission signal s(k) (the PN code of the symbol), and the demodulator functions to restore the signal s(k) from the reception signal r(k). Here, $\Delta fk$ is a value representing frequency offsets and $\Delta fN$ is a value representing phase offsets obtained from differentiating $\Delta fk$.

A plurality of noncoherent detectors 22 (FIG. 1) correlate the signals outputted from the multiple differentiator 21 with differentiated PN code signals of symbols to output correlation results. This process is described with reference to FIGS. 3 and 4.

Figure 3:
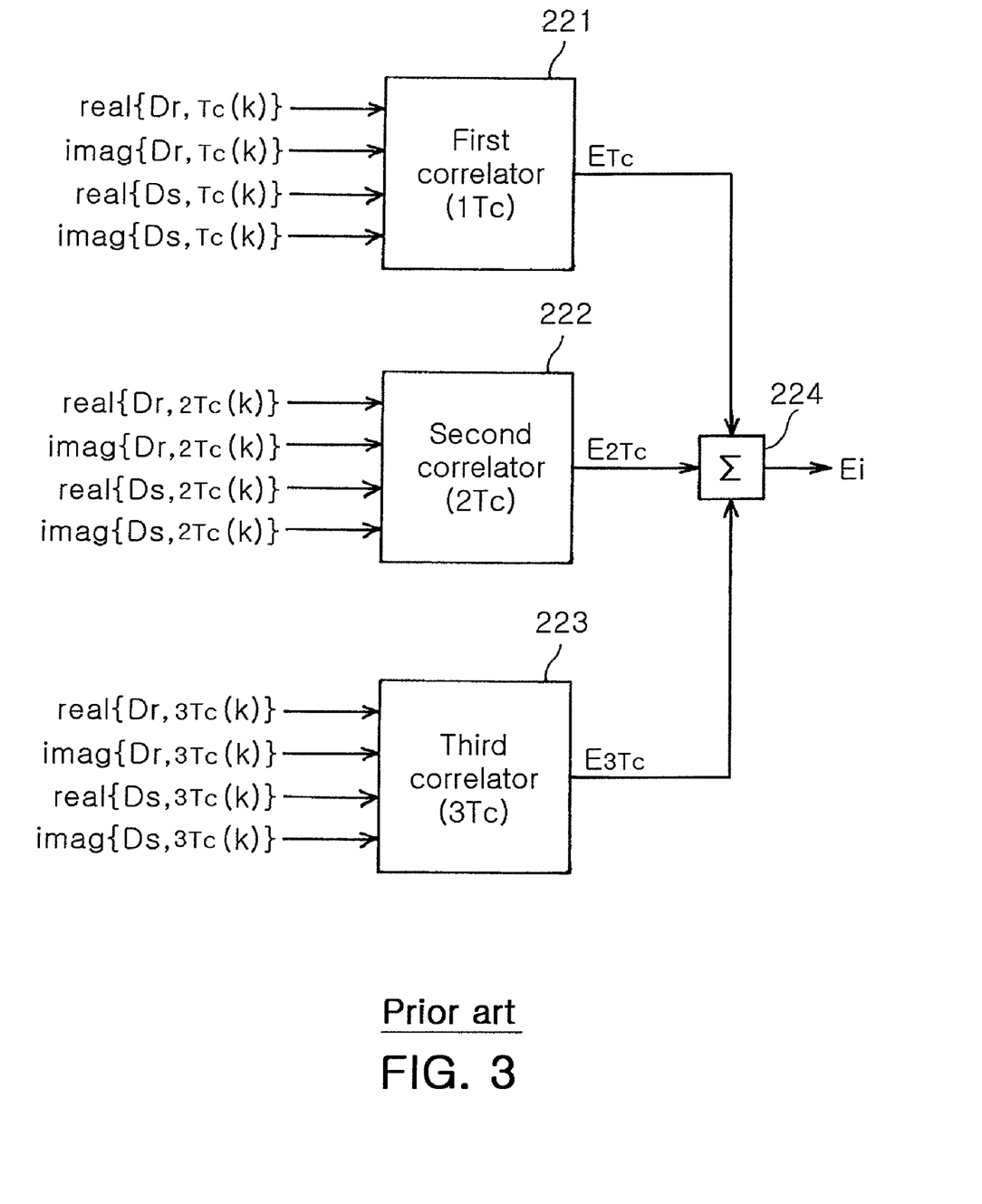
FIG. 3 is a detailed block diagram illustrating a noncoherent detector in the conventional multiple differential noncoherent demodulator.

FIG. 3 is a detailed block diagram of a noncoherent detector. As shown in FIG. 3, the noncoherent detector 22 (FIG. 1) includes first to third correlators 221 to 223 and a summer 224. The first to third correlators 221 to 223 complex-conjugate the differentiated signals by the delay times Tc, 2Tc and 3Tc with PN code signals differentiated (by each delay time) in the same fashion as the differentiated signals. The summer 224 sums output values from the first to third correlators 221 to 223 to output a correlation value Ei with the corresponding symbol, where i is a constant at least 0 and up to 15, referring to the corresponding symbol.

The first to third correlators 221 to 223 complex-multiply each of the plurality of differentiated signals $D_{r,Tc}(k)$, $D_{r,2Tc}(k)$ and $D_{r,3Tc}(k)$ outputted from the multiple differentiator 21 (FIG. 1) by PN code differentiated signals $D_{s,Tc}(k)$, $D_{s,2Tc}(k)$ and $D_{s,3Tc}(k)$ (also referred to as differentiated PN codes).

Figure 4:
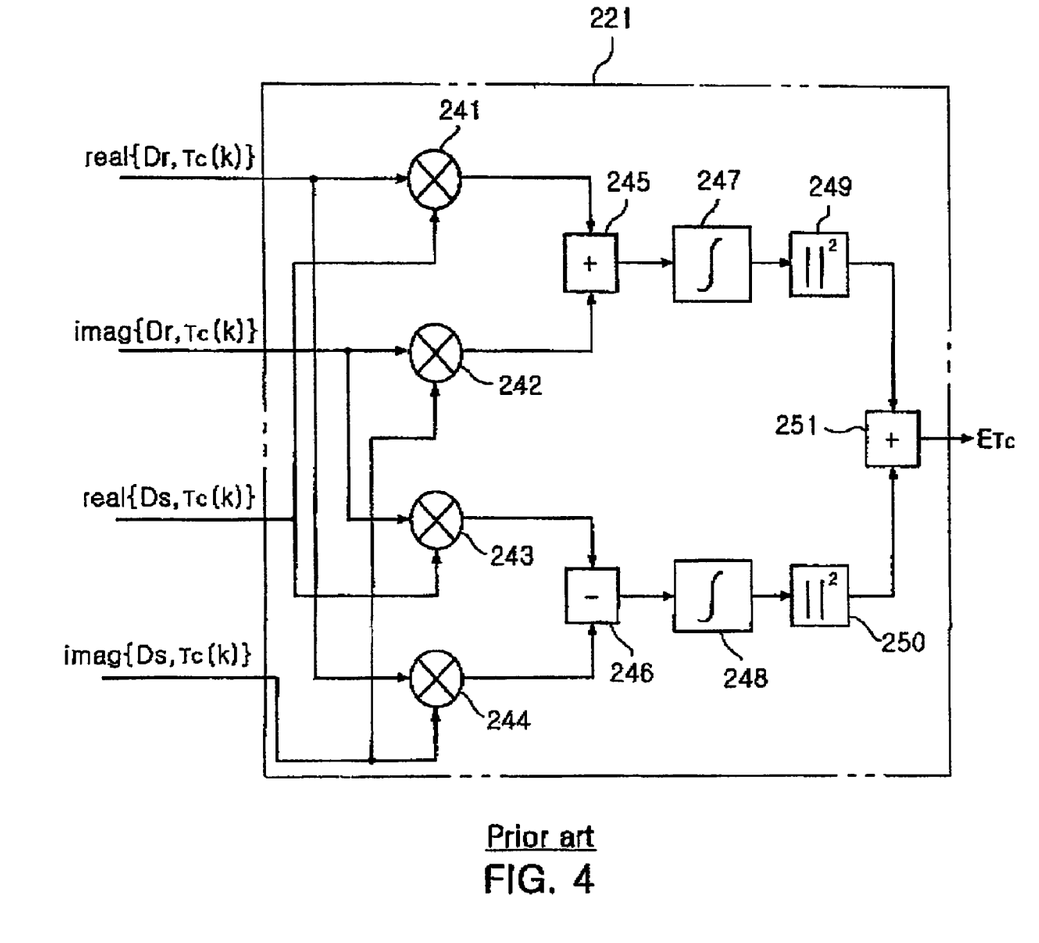
FIG. 4 is a detailed block diagram illustrating a correlator in the conventional noncoherent detector.

The PN code differentiated signals are differentiated in the same fashion as the differentiated signals. One of the correlators is shown in greater detail in FIG. 4. FIG. 4 is a detailed block diagram of the first correlator 221, which has an identical structure with the second correlator 222 and the third correlator 223. As shown in FIG. 4, the correlator 221 includes first to fourth multipliers 241 to 244, an adder 245, a subtractor 246, two integrators 247 and 248, two square operators 249 and 250, and another adder 251. Each of the first to fourth multipliers 241 to 244 distinguishes the differentiated signal $D_{r,Tc}(k)$ and the differentiated signal of the PN code $D_{s,Tc}(k)$ into a real part and an imaginary part, and conducts multiplication between the real parts/imaginary parts or between the real and imaginary parts. The adder 245 adds output values of the first and second multipliers 241 and 242, and the subtractor 246 calculates difference between output values of the third and fourth multipliers 243 and 244. The two integrators 247 and 248 respectively integrate the output values of the adder 245 and the subtractor 246 for one symbol period. The two square operators 249 and 250 respectively square output values from the two integrators 247 and 248. Another adder 251 adds output values of the two square operators 249 and 250 to output a correlation result $E_{Tc}$.

When the differentiated signals and the differentiated PN code signals are complex-multiplied, four multiplication results are obtained from the first to fourth multipliers 241 to 244. Afterwards, the multiplication results are integrated by the integrators 247 and 248. Then, the real part and the imaginary part are squared respectively. The final results are added together to obtain the correlation result $E_{Tc}$.

The correlation results $E_{Tc}$, $E_{2Tc}$ and $E_{3Tc}$ for each delay time outputted from the first to third correlators 221 to 223 having the structure and operation described above (FIG. 3) are summed by the summer 224 (FIG. 3) to acquire a correlation value Ei between the reception signal and the symbol. The correlation value Ei outputted from the noncoherent detector 22 (FIG. 1) can be expressed as in Equation 3 below.

$$Ei = \sum_{j=0}^{3} \left| \sum_{K=N}^{K} [D_r(k)D_s(k)^*] \right|^2 \quad \text{Equation 3}$$

In above Equation 3, N represents a delay time and K represents the number of samples in a symbol period.

Then, the maximum value selector 23 (FIG. 1) compares the correlation values outputted from the plurality of noncoherent detectors 22 (FIG. 1) operated as described above to detect the maximum value, and determines the symbol value corresponding to the PN code with the maximum value as the demodulation value of the reception signal r(k).

According to the conventional multiple differential noncoherent demodulator having the configuration as described above, as the reception signal r(k) is converted to a differentiated reception signal (differentiated value of the reception signal) $D_r(k)$, phase offsets remain as seen in Equation 2. Thus, the correlators of the noncoherent detector execute square operations to sum the squared values in order to compensate for the phase offsets. However, due to these square operations, a signal including noise is squared to result in square loss, thereby degrading transmission performance.

SUMMARY OF THE INVENTION

The present invention has been made to solve the foregoing problems of the prior art and therefore an object of certain embodiments of the present invention is to provide a multiple differential demodulator in which a correlator does not adopt square operations but applies a weighting value to the greater value of a real part and an imaginary part to decrease phase offsets, thereby eliminating square loss.

According to an aspect of the invention for realizing the object, there is provided a multiple differential demodulator using a weighting value to detect a symbol of a reception signal, including: a multiple differentiator for multi-delaying the reception signal by a plurality of predetermined delay times, conjugating and then multiplying the delayed reception signals by a current reception signal to output a plurality of differentiated reception signals; a weighting value generator for integrating a real part and an imaginary part of a value acquired by multiplying one of the plurality of differentiated reception signals by a conjugated value of a differentiated PN code signal corresponding to a preset symbol, and determining the greater of the integrated real and integrated imaginary parts to apply a predetermined weighting value to the greater value, where the PN code signal is differentiated in the same fashion as the differentiated reception signals; a plurality of coherent detectors for integrating the real part and the imaginary part of the value acquired by multiplying the plurality of differentiated reception signals by the conjugated value of the differentiated PN code signal corresponding to the preset symbol, multiplying the integration value determined greater by the weighting value generator by the weighting value, and adding the multiplied value with the rest of the integration values to compute a correlation value between the reception signal and the corresponding symbol, where the PN code signal is differentiated in the same fashion as the differentiated reception signals to acquire an integration value; and a maximum value selector for comparing output results of the plurality of coherent detectors and determining a preset symbol of the coherent detector having the maximum correlation value as a symbol for the reception signal.

According to a preferred embodiment of the invention, the weighting value generator includes: each of two integrators for integrating, for one symbol period, a real part and an imaginary part of a value acquired by multiplying one of the plurality of differentiated reception signals by a conjugated value of a differentiated PN code signal corresponding to a preset symbol, where the PN code signal is differentiated in the same fashion as the differentiated reception signals; a value comparing part for determining which is greater of integration values of the two integrators; and a weighting value generating part for applying the predetermined weighting value to the integration value determined greater by the value comparing part.

According to a preferred embodiment of the invention, each of the plurality of coherent detectors includes: a plurality of correlators for integrating the real part and the imaginary part of the value acquired by multiplying the differentiated reception signal by the conjugated value of the differentiated PN code signal corresponding to the preset symbol, multiplying the integration value determined greater by the weighting value generator by the weighting value, and adding the multiplied value with the rest of the integration values to output a resultant value to acquire integration values, where the PN code signal is differentiated in the same fashion as the differentiated reception signal; and a summer for summing values outputted from the plurality of correlators to output as the correlation value of the corresponding PN code.

At this time, the correlator includes: a first multiplier for multiplying the real part of the differentiated reception signal by the real part of the differentiated signal of the PN code; a second multiplier for multiplying the imaginary part of the differentiated reception signal by the imaginary part of the differentiated signal of the PN code; a third multiplier for multiplying the imaginary part of the differentiated reception signal by the real part of the differentiated signal of the PN code; a fourth multiplier for multiplying the real part of the differentiated reception signal by the imaginary part of the differentiated signal of the PN code; a first adder for adding values outputted from the first multiplier and the second multiplier; a subtractor for subtracting an output value of the fourth multiplier from an output value of the third multiplier; a first integrator for integrating an output value of the first adder for one symbol period; a second integrator for integrating an output value of the subtractor for one symbol period; a fifth multiplier for multiplying an integration value of the first integrator by the weighting value of the weighting value generator or 1; a sixth multiplier for multiplying an integration value of the second integrator by the weighting value of the weighting value generator or 1; and a second adder for adding values outputted from the fifth multiplier and the sixth multiplier.

BRIEF DESCRIPTION OF THE DRAWINGS

The above and other objects, features and other advantages of the present invention will be more clearly understood from the following detailed description taken in conjunction with the accompanying drawings, in which:

FIGS. 8 (a) and (b) are graphs comparing bit error rate of the multiple differential demodulator according to the present invention with that of the conventional multiple differential noncoherent demodulator.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity.

Figure 5:
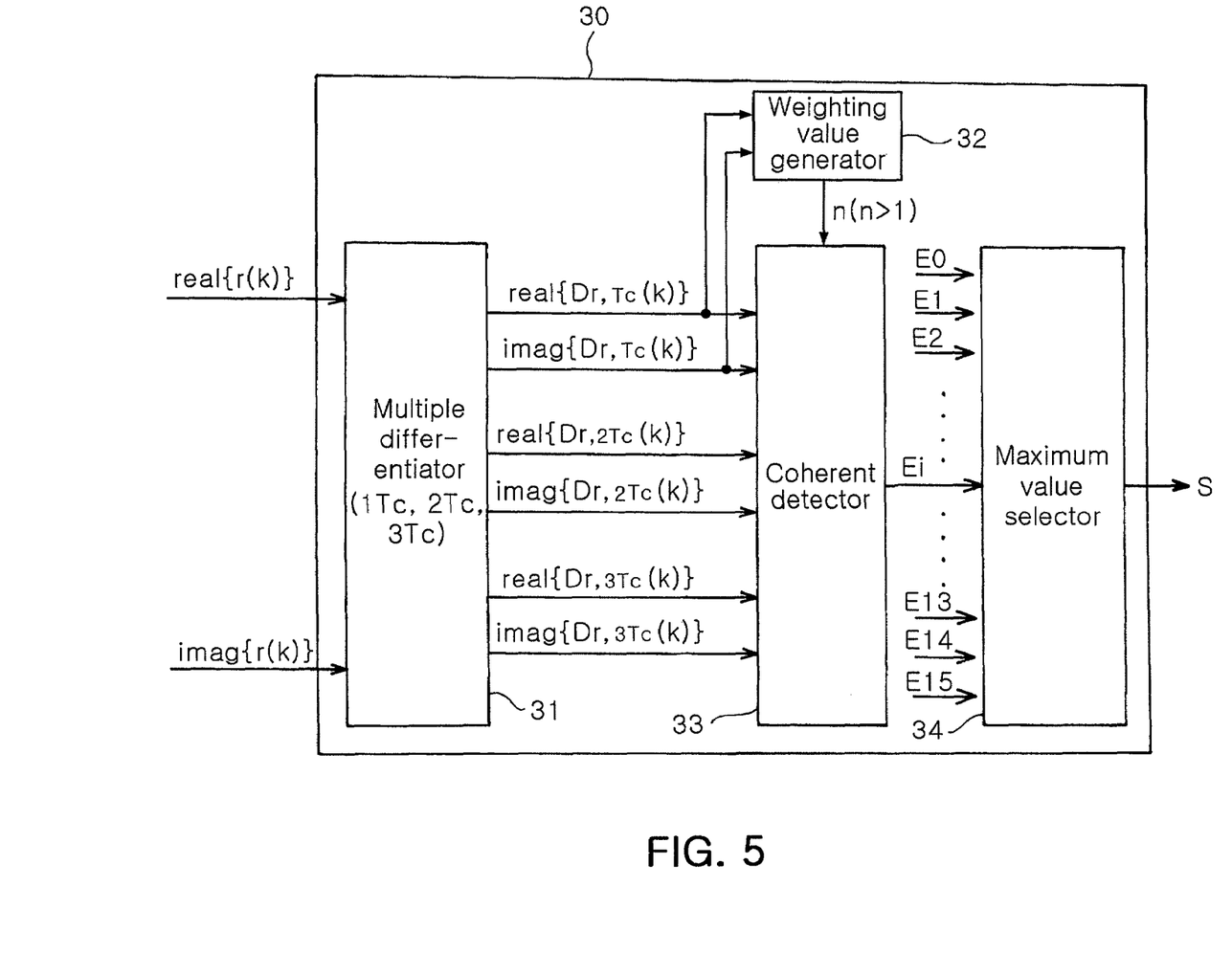
FIG. 5 is a block diagram illustrating a multiple differential demodulator according to the present invention.

FIG. 5 is a block diagram illustrating a multiple differential demodulator according to the present invention. Referring to FIG. 5, the multiple differential demodulator 30 using a weighting value includes a multiple differentiator 31, a weighting value generator 32, a plurality of coherent detectors 33 and a maximum value selector 34. The multiple differentiator 31 delays a complex signal received at an IF end of a receiver by a plurality of predetermined delay times Tc, 2Tc and 3Tc, conjugates and then multiplies the delayed signals by a current reception signal. The weighting value generator 32 determines the greater value of a real part and an imaginary part of a value obtained by multiplying one $D_{r,Tc}(k)$ of the differentiated reception signals outputted from the multiple differentiator 31 by a conjugated value of a differentiated PN code signal corresponding to a set symbol, where the PN code signal is differentiated in the same fashion as the differentiated signals, to apply a predetermined weighting value to the greater value. The plurality of coherent detectors 33 integrate the real part and the imaginary part of the value obtained by multiplying the differentiated reception signals $D_{r,Tc}(k)$, $D_{r,2Tc}(k)$ and $D_{r,3Tc}(k)$ outputted from the multiple differentiator 31 by the conjugated value of the differentiated signal of the PN code corresponding to the set symbol, where the PN code signal is differentiated in the same fashion as the differentiated reception signals to obtain an integrated value. The coherent detector 33 multiplies the integrated value of the greater value of either the real part or the imaginary part determined by the weighting value generator, by the weighting value, and adds a resultant value and the rest of the integrated values to compute a correlation value between the reception signal and the corresponding symbol. The maximum value selector 34 compares the output results of the plurality of coherent detectors 33 and determines the symbol corresponding to the coherent detector 33 having the greatest correlation value as the symbol of the reception signal.

The multiple differentiator 31 and the maximum value selector 34 of the multiple differential demodulator 30 with the above described configuration have the same constitutions and operations as those in the conventional multiple differential noncoherent demodulator shown in FIG. 1. However, the multiple differential demodulator 30 of the present invention further includes a weighting value generator 32 to result in different constitutions and operations of the coherent detector 33. Therefore, detailed explanation on the multiple differentiator 31 and the maximum value selector 34 is omitted.

Figure 6:
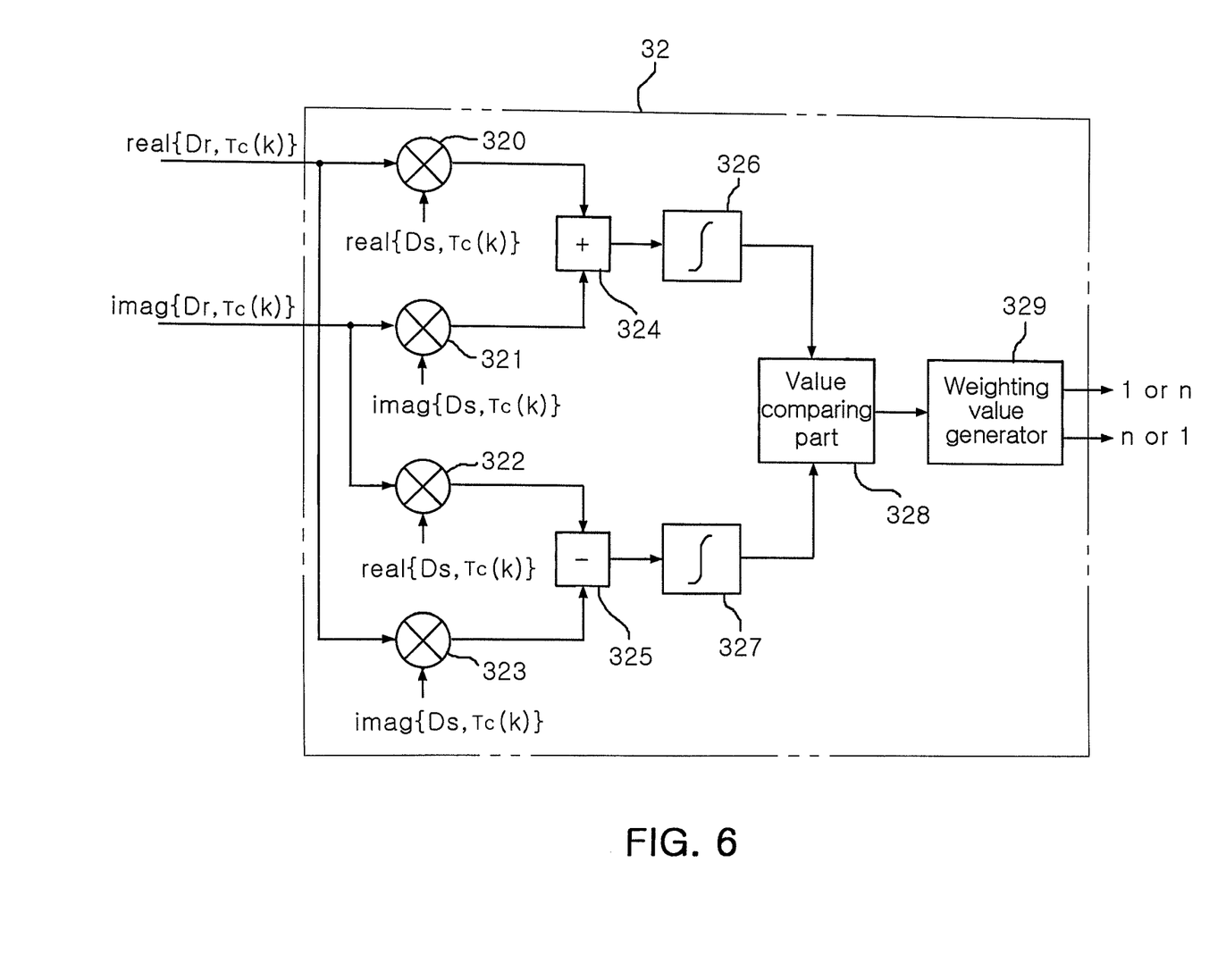
FIG. 6 is a detailed block diagram illustrating a weighting value generator included in the multiple differential demodulator according to the present invention.

FIG. 6 is a more detailed block diagram illustrating the weighting value generator 32 included in the multiple differential demodulator 30 according to the present invention. Referring to FIG. 6, the weighting value generator 32 may include a value comparing part 328 and a weighting value generating part 329. The value comparing part 328 determines the greater value of either the real part or the imaginary part of the value obtained by multiplying one $D_{r,Tc}(k)$ of the differentiated reception signals by the conjugated value of the differentiated signal $D_{s,Tc}(k)$ of the PN code corresponding to the set symbol, where the PN code signal $D_{s,Tc}(k)$ is differentiated in the same fashion as the differentiated reception signal. The weighting value generating part 329 applies the predetermined weighting value to the real part or the imaginary part determined greater by the value comparing part 328.

To execute the multiplication of one of the plurality of differentiated reception signals by the conjugated value of the differentiated signal of the PN code corresponding to the set symbol, differentiated in the same fashion as the differentiated reception signals, the weighting value generator 32 includes a first multiplier 320, a second multiplier 321, a third multiplier 322, a fourth multiplier 323, an adder 324, a subtractor 325, a first integrator 326 and a second integrator 327. The first multiplier 320 multiplies the real part real$\{D_{r,Tc}(k)\}$ of the differentiated reception signal by the real part real$\{D_s,$ $_{Tc}(k)$} of the differentiated signal of the PN code. The second multiplier 321 multiplies the imaginary part imag{$D_{r,Tc}(k)$} of the differentiated reception signal by the imaginary part imag{$D_{s,Tc}(k)$} of the differentiated signal of the PN code. The third multiplier 322 multiplies the imaginary part imag{$D_{r,Tc}(k)$} of the differentiated reception signal by the real part real{$D_{s,Tc}(k)$} of the differentiated signal of the PN code. The fourth multiplier 323 multiplies the real part real{$D_{r,Tc}(k)$} of the differentiated reception signal by the imaginary part imag{$D_{s,Tc}(k)$} of the differentiated signal of the PN code. The adder 324 adds values outputted from the first multiplier 320 and the second multiplier 321, and the subtractor 325 subtracts an output value of the fourth multiplier 323 from an output value of the third multiplier 322. The first integrator 326 integrates an output value of the adder 324 for one symbol period, and the second integrator 327 integrates an output value of the subtractor 325 for one symbol period. The output of the adder 324 becomes a real part of a value obtained by multiplying one of the differentiated reception signals by the conjugated value of the differentiated PN code signal corresponding to the set symbol, where the PN code signal is differentiated in the same fashion as the differentiated reception signal. The output value of the subtractor 325 becomes an imaginary part of the value obtained by multiplying one of the differentiated reception signals by the conjugated value of the differentiated signal of the PN code corresponding to the set symbol differentiated in the same fashion as the differentiated reception signal.

The differentiated signal Ds(k) of the PN code is s(k)s(k−N), and thus Dr(k) equals to Ds(k) (cos $2\pi\Delta fN$+j sin $2\pi\Delta fN$). Therefore, the value acquired by multiplying one of the differentiated reception signals calculated by the weighting value generator 32 by the conjugated value of the differentiated signal of the PN code corresponding to the set symbol, differentiated in the same fashion as the differentiated reception signal, is as expressed in Equation 4 below.

$$D_r(k)D_s(k)^* = [D_s(k)D_s(k)^*](\cos 2\pi\Delta fN + j\sin 2\pi\Delta fN) \quad \text{Equation 4}$$

Here, Ds(k)Ds(k)* is always a real value, and thus comparing the real part and the imaginary part is comparing the cosine value with the sine value. That is, when the real part is greater, cos $2\pi\Delta fN$ is greater than sin $2\pi\Delta fN$ where $2\pi\Delta fN$ is a value between 0 and $\pi/4$, and when the imaginary part is greater, cos $2\pi\Delta fN$ is smaller than sin $2\pi\Delta fN$ where $2\pi\Delta fN$ is a value between $\pi/4$ and $\pi/2$.

The value comparing part 328 determines the greater value of either the real part or the imaginary part, and the weighting value generating part 329 generates and outputs a weighting value to be applied to the greater value. The weighting value outputted from the weighting value generating part 329 should be a value always greater than 1, which is applied to the greater value of either the real part or the imaginary part of the value computed by the correlator of the coherent detector 33.

Figure 7:
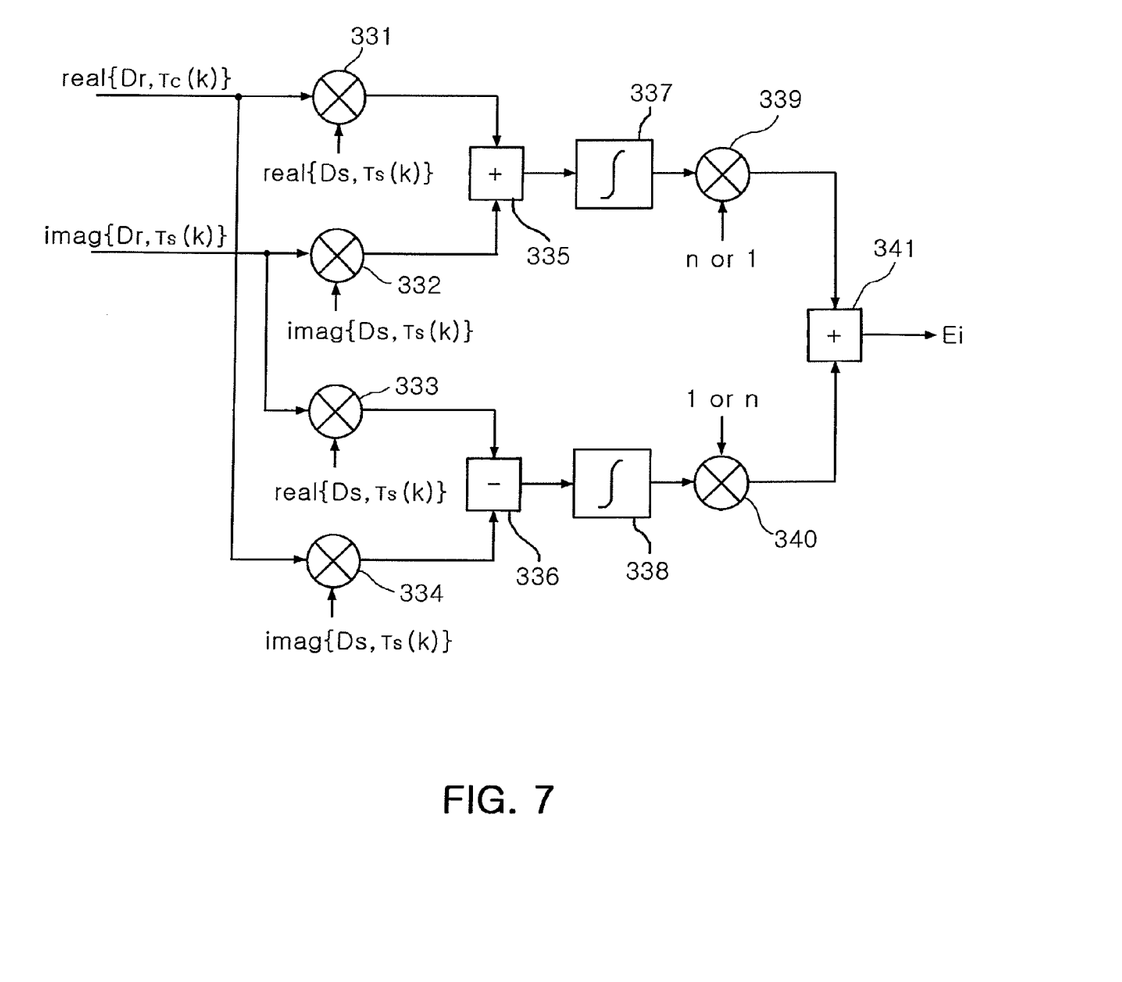
FIG. 7 is a detailed block diagram illustrating a coherent detector included in the multiple differential demodulator according to the present invention.

FIG. 7 is a detailed block diagram illustrating the correlator in the coherent detector included in the multiple differential demodulator according to the present invention. Similar to the noncoherent detector explained with reference to FIG. 3 in the prior art section, the coherent detector according to the present invention may include a plurality of correlators, and a summer for summing the values outputted from the correlators to output as the correlation value of the corresponding PN code. However, each of the correlators has a different constitution from that of the conventional noncoherent detector as shown in FIG. 7.

Explaining the correlator in the coherent detector according to the present invention in greater detail with reference to FIG. 7, the correlator integrates the real part and the imaginary part of the value obtained by multiplying the differentiated reception signals by the conjugated value of the differentiated signal of the PN code corresponding to the set symbol, where the PN code signal is differentiated in the same fashion as the differentiated reception signal to acquire the integration values. The correlator then multiplies the weighting value by the integration value of the real part or the imaginary part determined greater by the weighting value generating part, and then adds the resultant value to the rest of the integration values. The correlator has following configurations to realize the above described operation. The correlator includes a first multiplier 331, a second multiplier 332, a third multiplier 333, a fourth multiplier 334, a fifth multiplier 339, a sixth multiplier 340, a first adder 335, a second adder 341, a subtractor 336, a first integrator 337 and a second integrator 338. The first multiplier 331 multiplies the real part real{$D_{r,Tc}(k)$} of the differentiated reception signal by the real part real{$D_{s,Tc}(k)$} of the differentiated signal of the PN code. The second multiplier 332 multiplies the imaginary part imag{$D_{r,Tc}(k)$} of the differentiated reception signal by the imaginary part imag{$D_{s,Tc}(k)$} of the differentiated signal of the PN code. The third multiplier 333 multiplies the imaginary part imag{$D_{r,Tc}(k)$} of the differentiated reception signal by the real part real{$D_{s,Tc}(k)$} of the differentiated signal of the PN code. The fourth multiplier 334 multiplies the real part real{$D_{r,Tc}(k)$} of the differentiated reception signal by the imaginary part imag{$D_{s,Tc}(k)$} of the differentiated signal of the PN code. The first adder 335 adds output values from the first multiplier 331 and the second multiplier 332. The subtractor 336 subtracts a value of the fourth multiplier 334 from a value of the third multiplier 333. The first integrator 337 integrates an output value of the first adder 335 for one symbol period, and the second integrator 338 integrates an output value of the subtractor 336 for one symbol period. The fifth multiplier 339 multiplies the integration value of the first integrator 337 by the weighting value by the weighting value generator 32 (FIG. 5) or 1. The sixth multipler 340 multiplies the integration value of the second integrator 338 by 1 or the weighting value by the weighting value generator 32 (FIG. 5). The second adder 341 adds the output values of the fifth multiplier 339 and the sixth multiplier 340.

The weighting value used in multiplication operations by the fifth multiplier 339 and the sixth multiplier 340 is inputted into the multiplier corresponding to the value determined greater by the weighting value generator 32 (FIG. 5). That is, if the real part is determined greater, the weighting value n is applied to the fifth multiplier 339, and 1 is applied to the sixth multiplier 340. IF the imaginary part is determined greater, the weighting value n is applied to the sixth multiplier 340 and 1 is applied to the fifth multiplier 339.

Therefore, the correlation value obtained by adding all the values outputted from the plurality of correlators according to the delay times can be represented as in following Equations 5 and 6. Equation 5 below represents the correlation value in case of the greater real part, and Equation 6 below represents the correlation value in case of the greater imaginary part.

$$E_i = \sum_{N=1}^{3}\sum_{k=N}^{K}[D_s(k)D_s(k)^*](n\cos 2\pi\Delta fN + j\sin 2\pi\Delta fN) \quad \text{Equation 5}$$

$$= \sum_{N=1}^{3}\sum_{k=N}^{K}[D_s(k)D_s(k)^*]n\cos(2\pi\Delta fN - \tan^{-1}(1/n))$$

-continued $$E_i = \sum_{N=1}^{3} \sum_{k=N}^{K} [D_s(k)D_s(k)^*](\cos 2\pi \Delta fN + jn\sin 2\pi \Delta fN)$$ Equation 6

$$= \sum_{N=1}^{3} \sum_{k=N}^{K} [D_s(k)D_s(k)^*]n\cos(2\pi \Delta fN - \tan^{-1}(n))$$

In Equations 5 and 6, the values of $\{2\pi\Delta fN - \tan^{-1}(1/n)\}$ and $\{2\pi\Delta fN - \tan^{-1}(1/n)\}$ are phase offsets with the weighting value applied, considering the frequency offset range. As demonstrated, some phase offsets exist in the multiple differential demodulator according to the present invention. However, the real part and the imaginary part of the above phase offset value vary in value at a reference point of π/4. Thus, different weighting values can be applied to decrease the varied amount of the final phase offsets. With a purpose of eliminating squaring loss (noise), the present invention allows some phase offsets but does not include the square operations to acquire the correlation value, thereby eliminating square loss.

Figure 8A:
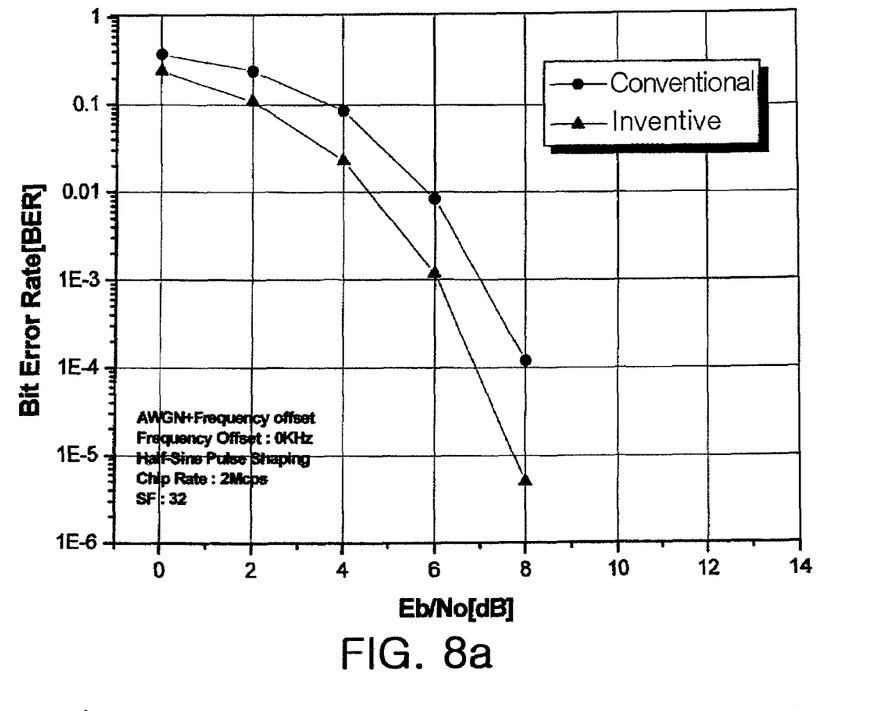
Figure 8B:
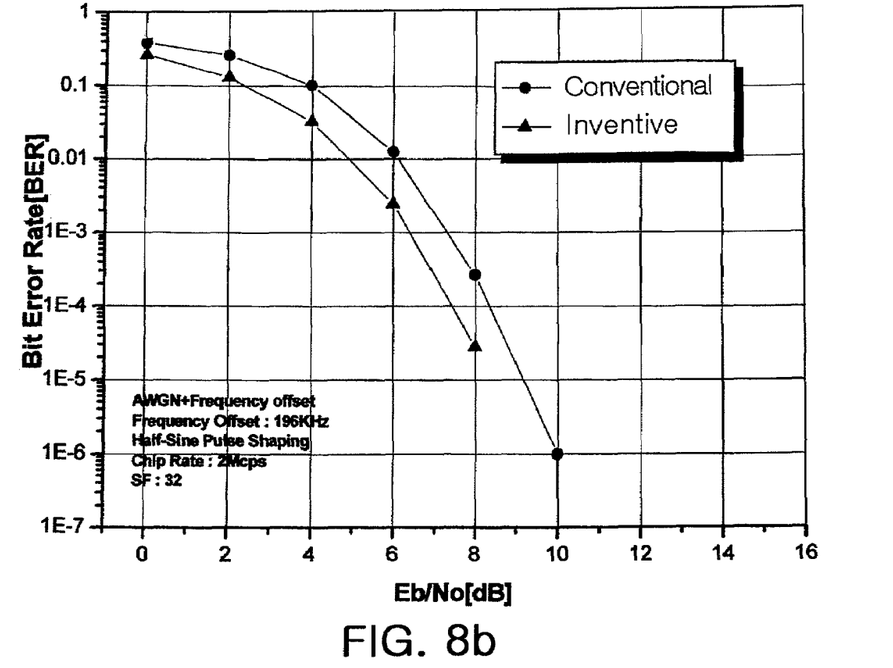

FIGS. 8 (a) and (b) are graphs comparing the bit error rates of the multiple differential demodulator according to the present invention with those of the conventional multiple differential noncoherent demodulator. FIG. 8(a) is a graph illustrating the bit error rate measured in a white noise (AWGN) environment with no frequency offsets, and FIG. 8(b) is a graph illustrating the bit error rate measured in a white noise environment with maximum frequency offsets (196 kHz). As shown in FIG. 8(a), the present invention yields at least 1 dB of reception performance improvement at the bit error rate of $10^{-3}$ compared with the prior art. In addition, as shown in FIG. 8(b), the present invention yields improvement in reception performance even in the environment with the maximum frequency offsets of 196 kHz which is the maximum level allowed by Zigbee standard.

According to the present invention as set forth above, the correlator of the coherent detector included in the multiple differential demodulator excludes the squaring operation, applies a weighting value to the greater of either the real part or the imaginary part and adds the values to output a correlation value. This decreases phase offsets and eliminating noise due to square loss, thereby significantly improving the reception performance of the receiver.

While the present invention has been shown and described in connection with the preferred embodiments, it will be apparent to those skilled in the art that modifications and variations can be made without departing from the spirit and scope of the invention as defined by the appended claims.

What is claimed is:

1. A multiple differential demodulator using a weighting value to detect a symbol of a reception signal, comprising:
a multiple differentiator configured for multi-delaying the reception signal by a plurality of predetermined delay times, conjugating and then multiplying the delayed reception signals by a current reception signal to output a plurality of differentiated reception signals;
a weighting value generator configured to: integrate a real part and an imaginary part of a value acquired by multiplying one of the plurality of differentiated reception signals by a conjugated value of a differentiated PN code signal corresponding to a preset symbol; determine the greater of the integrated real and integrated imaginary parts; and apply a predetermined weighting value to the greater of the integrated real and integrated imaginary parts to generate a weighting value output, where the PN code signal is differentiated in the same fashion as the differentiated reception signals;
a plurality of coherent detectors configured to: generate an integration value by integrating the real part and the imaginary part of the value acquired by multiplying the plurality of differentiated reception signals by the conjugated value of the differentiated PN code signal corresponding to the preset symbol; multiply the integration value by the weighting value output; and add the multiplied integration value to the rest of the integration values in order to generate a resultant value used to compute a correlation value between the reception signal and a symbol corresponding to the reception signal; and
a maximum value selector configured to compare output results of the plurality of coherent detectors and determine the preset symbol of a coherent detector having a maximum correlation value as a symbol for the reception signal.

2. The multiple differential demodulator according to claim 1, wherein the weighting value generator comprises:
two integrators, each of the integrators configured to integrate, for one symbol period, the real part and the imaginary part of the value acquired by multiplying one of the plurality of differentiated reception signals by the conjugated value of the differentiated PN code signal corresponding to the preset symbol, where the PN code signal is differentiated in the same fashion as the differentiated reception signals;
a value comparing part configured to determine a greater of integration values of the two integrators; and
a weighting value generating part configured to apply the predetermined weighting value to the integration value determined greater by the value comparing part.

3. The multiple differential demodulator according to claim 1, wherein each of the plurality of coherent detectors comprises:
a plurality of correlators configured to: generate an integration value by integrating the real part and the imaginary part of the value acquired by multiplying the plurality of differentiated reception signal by the conjugated value of the differentiated PN code signal corresponding to the preset symbol; multiply the integration value determined greater by the weighting value generator by the weighting value output; and add the multiplied integration value with the rest of the integration values to output the resultant integration value, where the PN code signal is differentiated in the same fashion as the plurality of differentiated reception signal; and
a summer for summing values outputted from the plurality of correlators to output as the correlation value of the symbol corresponding to the reception signal.

4. The multiple differential demodulator according to claim 3, wherein each of the plurality of correlators comprises:
a first multiplier for multiplying the real part of a differentiated reception signal by the real part of the differentiated PN code signal;
a second multiplier for multiplying the imaginary part of a differentiated reception signal by the imaginary part of the differentiated PN code signal;
a third multiplier for multiplying the imaginary part of the differentiated reception signal by the real part of the differentiated PN code signal;

a fourth multiplier for multiplying the real part of the differentiated reception signal by the imaginary part of the differentiated PN code signal;

a first adder for adding values outputted from the first multiplier and the second multiplier;

a subtractor for subtracting an output value of the fourth multiplier from an output value of the third multiplier;

a first integrator for integrating an output value of the first adder for one symbol period;

a second integrator for integrating an output value of the subtractor for one symbol period;

a fifth multiplier for multiplying an integration value of the first integrator by the weighting value output of the weighting value generator or 1;

a sixth multiplier for multiplying an integration value of the second integrator by 1 or the weighting value output of the weighting value generator; and a second adder for adding values outputted from the fifth multiplier and the sixth multiplier.

* * * * *